July 6, 1954 — R. IREDELL III — 2,683,007

CUSHIONING AND VIBRATION DAMPENING SUPPORT

Filed July 30, 1949

INVENTOR
Robert Iredell III
BY Evans + McCoy
ATTORNEYS

Patented July 6, 1954

2,683,007

UNITED STATES PATENT OFFICE 2,683,007

CUSHIONING AND VIBRATION DAMPENING SUPPORT

Robert Iredell III, Wabash, Ind., assignor to The General Tire and Rubber Company, Akron, Ohio, a corporation of Ohio Application July 30, 1949, Serial No. 107,734

4 Claims. (Cl. 248—8)

This invention relates to cushioning and vibration dampening supports and has for its principal objects to provide a support that is universally flexible that provides an effective spring cushion horizontally as well as vertically, that effectively dampens vibrations and that effectively snubs both vertical and horizontal movements.

More specifically, the invention has for its object to provide a support in which the cushioning elements are composed of elastic rubber and to provide a support in which vertical impacts are cushioned by direct compressive thrust on a block of rubber that provides a rolling cushion and in which the thrust members are secured together in engagement with the main cushioning block by means of a yieldable cushioning element which also serves as a snubbing element.

The invention is particularly applicable to engine mountings and provides a substantially universally yieldable support which gives the engine torsional flexibility within desirable limits. With the above and other objects in view, the invention may be said to comprise the cushioning device as illustrated in the accompanying drawings and hereinafter described, together with such variations and modifications thereof as will be apparent to one skilled in the art to which the invention pertains.

Reference should be had to the accompanying drawings forming a part of this specification, in which.

Figure 1:
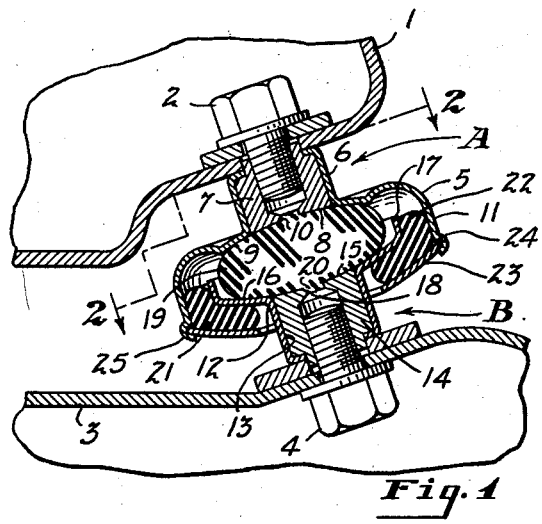
Figure 1 is an axial section through a support embodying the invention, showing the same interposed between the frame of an automobile and an engine supporting member.

In the accompanying drawings the support of the present invention is shown interposed between the engine and frame of an automobile, the support comprising an upper thrust member A that is attached to an engine carrying frame member 1 by means of a bolt 2, and a thrust member B attached to an automobile frame member 3 by means of a bolt 4.

The thrust member A comprises a cup-shaped sheet metal stamping 5 having a central recessed portion 6 that provides a socket to receive an attaching block 7 into which the bolt 2 is screwed. The block 7 has a concave inner face 8 and the stamping 5 has a concave inner face portion 9 which forms a continuation of the face 8. The recessed portion 6 and block 7 provide the thrust member A with an attaching portion that projects from the outer face thereof, and the faces 8 and 9 of the block 7 and stamping 5 provide a concave inner seating face on the thrust member A. Centrally thereof the block 7 has an opening 10 which leads to the threaded socket which receives the bolt 2.

The thrust member A, which is of greater diameter than the thrust member B, has an axially extending peripheral flange 11 within which the thrust member B is received.

The thrust member B comprises a stamping 12 that is provided with a central socket portion 13 to receive the attaching block 14. The block 14 has a concave inner face 15 which is flush with and forms a continuation of the concave inner face 16 of the stamping 12, the face portions 15 and 16 providing the thrust member B with a concave inner bearing face, and the socket portion 13 and block 14 providing an axially projecting attaching portion. The stamping 12 has a short peripheral flange 17 which is of substantially less diameter than the flange 11 of the thrust member A so that the thrust member B is readily received within the thrust member A and may be tilted with respect to the thrust member A.

Centrally thereof the block 14 has an opening 18 extending from its inner face 16 to the threaded socket which receives the bolt 4. A cushioning block 19 of elastic rubber is interposed between the concave inner faces of the thrust members A and B, and this block preferably has opposite convex portions which fit in the concave faces of the thrust member. The diameter of the block 19 is substantially less than that of the flange 11 of the thrust member A, so that the block 19 is free to expand radially when subjected to axial compression and provides an elastic thrust receiving cushion between the thrust members A and B.

The block 19, which is preferably of oblately spheroidal form, has polar projections 20 that extend into the recess formed by the openings 10 and 18 to retain the block in a position centered with respect to the thrust members A and B.

An elastic rubber cushioning annulus 21 of disk like form engages the outer face of the thrust member B and surrounds the attaching projection 13 thereof. The cushioning annulus 21 is of greater diameter and less thickness than the block 19 and may be provided with a peripheral flange portion 22 interposed between the periphery of the thrust member B and the interior of the flange 11 of the thrust member A. The flange 17 of the thrust member B provides a bearing face for engagement with the flange portion 22 of the cushioning annulus and also serves to impede lateral rolling movements of the block 19. The flange 17, impedes lateral movements of the block 19 and serves to snub relative horizontal movements of the thrust members. The flange 17 may, in some instances, be omitted as shown in Fig. 4 of the drawings.

The outer face of the cushioning annulus 21 is engaged by an annular retaining plate 23 that is disposed within the flange 11, having its periphery in engagement with a shoulder 24 on the flange 11 which positions the retaining member 23, the member 23 being held against the shoulder 24 by means of an inwardly bent edge portion 25 of the flange 11. The retaining plate 23 is so positioned with respect to the inner bearing face of the thrust member A that the annulus 21 and the cushioning block 19 are both normally subjected to axial compression. Downward thrust upon the thrust member A reduces the axial thickness of the block 19 and expands the same radially. At the same time the retaining plate 23 moves away from the outer face of the thrust member B, relieving the axial pressure on the cushioning annulus 22. Upon rebound the cushioning block 19 expands axially while the cushioning annulus 21 is compressed between the thrust member B and the retaining plate 23. When the cushioning support of the present invention is applied to an engine mounting, the initial compression of the cushioning elements is preferably such that the static load of the engine compresses the rubber block 19 sufficiently to relieve the precompression in the rubber ring 21, thus permitting relatively free relative horizontal movements of the thrust members due to the rolling action of the rubber block 19.

The central openings of the cushioning annulus 21 and retaining plate 23 are of materially greater diameter than the projection 13 of the thrust member B, so that the thrust members A and B may have relative horizontal and angular movements as well as relative axial movements, the horizontal and angular movements as well as the axial movements being cushioned by the block 19 and annulus 21.

Figure 2:
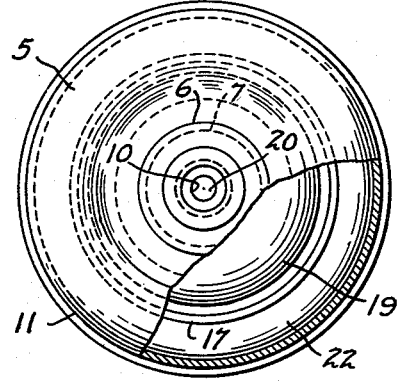
Fig. 2 is a plan view of the support viewed as indicated at 2—2 in Fig. 1, a portion of the support being broken away and shown in transverse section.
Figure 3:
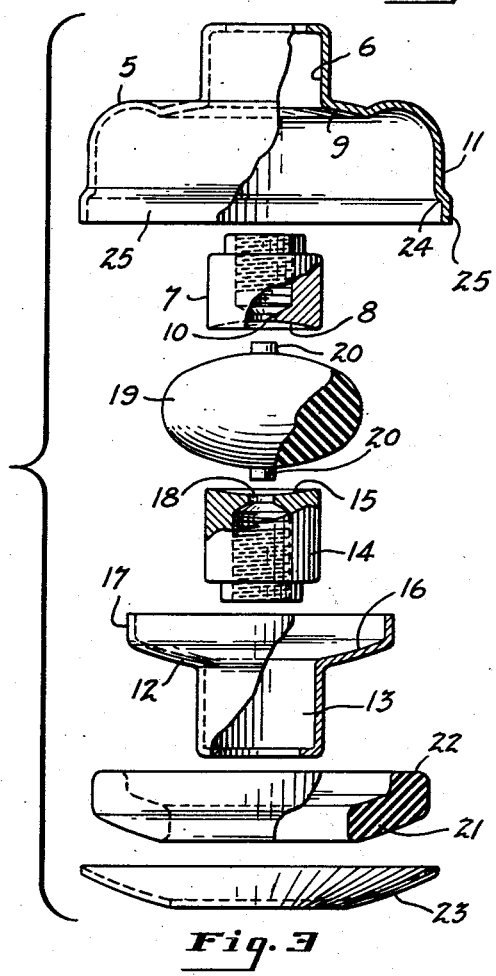
Fig. 3 is an exploded view separately showing each of the parts of the cushioning support.
Figure 4:
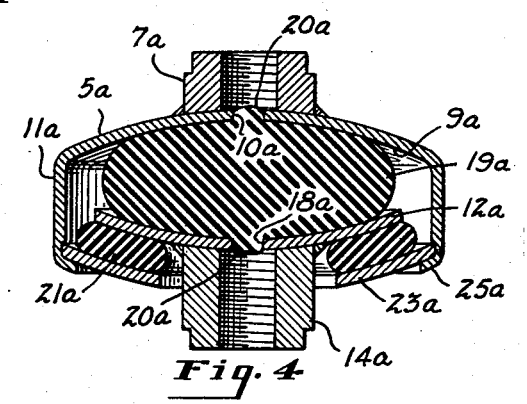
Fig. 4 is an axial section showing a slightly modified form of support.

In connection with the slightly modified structure shown in Fig. 4, the parts corresponding to parts shown in Figs. 1 to 3 are indicated by the same reference numerals, with the addition of the letter "a." As shown in Fig. 4, the stamping 5a has an attaching block 7a that is externally attached thereto, and is provided with an inner concave face 9a, a central opening 10a and a cylindrical axially projecting flange 11a. The stamping 12a is in the form of a concave disk to which an extension 14a is centrally attached, the stamping 12a having a central opening 18a axially alined with the opening 10a.

The cushioning block 19a, which may be identical with the cushioning block above described, has projections 20a that fit in the recesses formed by the openings 10a and 18a. A cushioning annulus 21a of elastic rubber engages the outer face of the disk member 12a and is confined between the member 12a and a retaining annulus 20a that is secured to the annulus 11a by means of a marginal inwardly bent portion 24a of the flange 11a.

The cushioning annulus 21a differs from the cushioning annulus above described in that the external diameter of the annulus 21a is less than the internal diameter of the flange 11a, so that a greater range of relative horizontal and angular movements of the thrust members is provided.

Figure 5:
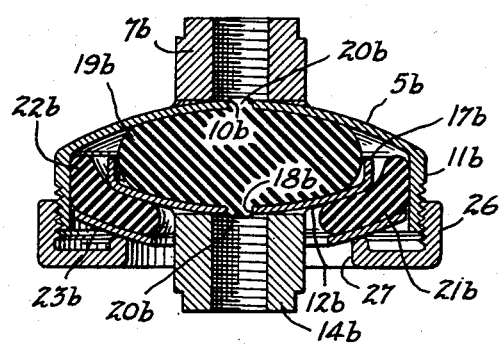
Fig. 5 is an axial section showing a further modification.

In Fig. 5 of the drawings, a modified structure is shown in which the retaining annulus 23b is received within a flange 11b and is held in place by means of a threaded collar 26 that is screwed on the flange 11b and that is provided with an inner flange 27 that bears against the outer face of the retaining annulus B. By adjusting the collar 26, the cushioning elements 19b and 21b may be placed under the desired axial compression.

It is to be understood that in accordance with the provisions of the patent statutes, variations and modifications of the specific devices herein shown and described may be made without departing from the spirit of the invention.

What I claim is:

1. A cushioning support comprising two axially alined and axially spaced thrust members having opposed concave inner faces each provided with a central recess, each of said thrust members having a central attaching portion projecting from its outer face, one of said thrust members being of greater diameter than the other and having a peripheral axially extending flange extending past and spaced radially from the periphery of the smaller thrust member, an oblately spheroidal elastic rubber load supporting and cushioning block interposed between said concave faces and having polar projections engaging in said central recesses, a disk like elastic rubber rebound cushioning annulus of greater diameter and less thickness than said block engaging the outer face of the smaller thrust member around its attaching portion and radially inwardly of said peripheral flange, and a retaining annulus carried by said flange and engaging the outer face of said cushioning annulus for holding said cushioning annulus against the smaller thrust member and normally subjecting said cushioning annulus and said cushioning block to axial compression.

2. A cushioning support comprising two axially alined and axially spaced thrust members having opposed inner faces and attaching portions projecting from their outer faces, said attaching portions being axially alined and centrally disposed with respect to said faces, one of said thrust members being of greater diameter than the other and having a peripheral flange portion spaced radially outwardly of and extending axially past the periphery of said other thrust member, an elastic rubber load supporting and cushioning block interposed between the inner faces of said thrust members centrally thereof, said block having its periphery spaced radially inwardly from said peripheral portion and being free to expand radially under axial compression, and an elastic disk like rubber rebound cushioning annulus separate from said block, said annulus being of less thickness and of greater diameter than said block, coaxial with said block and positioned against the outer face of said thrust member of smaller diameter and around the attaching member projecting therefrom, and an annular retaining member spaced axially outwardly from the outer face of said last mentioned thrust member and engaging the outer face of said cushioning annulus, said retaining member being mounted on said flange portion of the thrust member of larger diameter and held in a fixed position with respect thereto such that said load supporting block and said cushioning annulus are both normally subjected to axial compression.

3. A cushioning support comprising two axially alined and axially spaced thrust members having opposed inner concave faces and centrally disposed axially alined attaching portions projecting from their outer faces, one of said thrust members being of greater diameter than the other and having a peripheral circumferentially continuous flange spaced radially outwardly of and extending axially past the periphery of said other thrust member, said thrust member of smaller diameter having a convex outer face, a load supporting and cushioning block interposed between said thrust members centrally thereof and having convex faces engaging the concave inner faces of said thrust members, said block having its periphery spaced radially inwardly from said peripheral flange and being free to expand radially under axial compression, an elastic disk like rubber rebound cushioning annulus separate from said block, said annulus being of less thickness and greater diameter than said block, coaxial with said block and positioned against said convex outer face around the attaching portion projecting therefrom, said cushioning annulus having a peripheral portion in engagement with the interior of said flange portion and projecting into the space between said flange and the periphery of the thrust member of smaller diameter, and an annular retaining plate mounted on said flange portion in fixed position with respect thereto and engaging the outer face of said cushioning annulus.

4. A cushioning support comprising two axially alined and axially spaced thrust members having opposed inner concave faces and centrally disposed axially alined attaching portions projecting from their outer faces, one of said thrust members being of greater diameter than the other and having a peripheral circumferentially continuous flange spaced radially outwardly of and extending axially past the periphery of said other thrust member, said thrust member of smaller diameter having a convex outer face and a peripheral flange extending toward the inner face of the thrust member of larger diameter, a load supporting and cushioning block interposed between said thrust members and having convex faces engaging the concave inner faces of said thrust members, said block being of a thickness greater than the height of said last mentioned flange and of a normal diameter less than that of said last mentioned flange, whereby it is free to expand radially under axial compression, an elastic disk like rubber cushioning annulus separate from said block, said annulus being of less thickness and greater diameter than said block, coaxial with said block and positioned against said convex outer face around the attaching portion projecting therefrom, said cushioning annulus having a peripheral portion in engagement with the interior of said flange portion and projecting into the space between said flanges and an annular retaining plate carried by the thrust member of larger diameter and mounted in fixed position within the peripheral flange thereof, said plate engaging the outer face of said cushioning annulus and being positioned to normally hold said block and said cushioning annulus under axial compression, said retaining plate surrounding and being spaced radially outwardly of said attaching portion of the thrust member of smaller diameter.

References Cited in the file of this patent

UNITED STATES PATENTS

| Number | Name | Date |
| --- | --- | --- |
| 2,022,102 | Anibal | Nov. 26, 1935 |
| 2,079,798 | Geyer | May 11, 1937 |
| 2,359,036 | Harper | Sept. 26, 1944 |
| 2,437,206 | Neher | Mar. 2, 1948 |
| 2,457,706 | Neher | Dec. 28, 1948 |
| 2,467,759 | Lord | Apr. 19, 1949 |
| 2,477,501 | Tyler | July 26, 1949 |
| 2,571,281 | Neher | Oct. 16, 1951 |